March 6, 1928.  1,661,840

J. MANNESCHMIDT, JR.

CONDUIT COVER CLAMP

Filed July 9, 1924

INVENTOR
Jacob Manneschmidt Jr.
BY
ATTORNEYS

Patented Mar. 6, 1928.

1,661,840

UNITED STATES PATENT OFFICE.

JACOB MANNESCHMIDT, JR., OF BROOKLYN, NEW YORK.

CONDUIT-COVER CLAMP.

Application filed July 9, 1924. Serial No. 724,984.

This invention relates essentially to a pipe connection suitable for preventing any substance from entering the end of a pipe which is utilized for the eduction or intake of air, drainage or other fluid conduits.

The invention is designed to provide a plate clamp and devices for immovably wedging the clamp to the interior of the conduit.

An object of the invention is to provide a clamp that is rigidly held at the end of the pipe, merely by the adjustment of a screw coacting with an inclined plane of the clamp. In this arrangement the clamp by its adjusting devices can be fitted to pipes of variable interior diameter.

Another object of the invention is to provide means for stopping the inward movement of the clamp so that when arranged in place the stops in conjunction with the wedging means for the clamp will prevent any shift of the device.

The invention is designed to provide a perforated plate arranged to cover the clamp and means for adjusting the plate so as to move it to or from the clamp.

The invention resides more particularly in the novel combinations hereinafter described and claimed reference being made to the accompanying drawing in which:—

Figure 1:
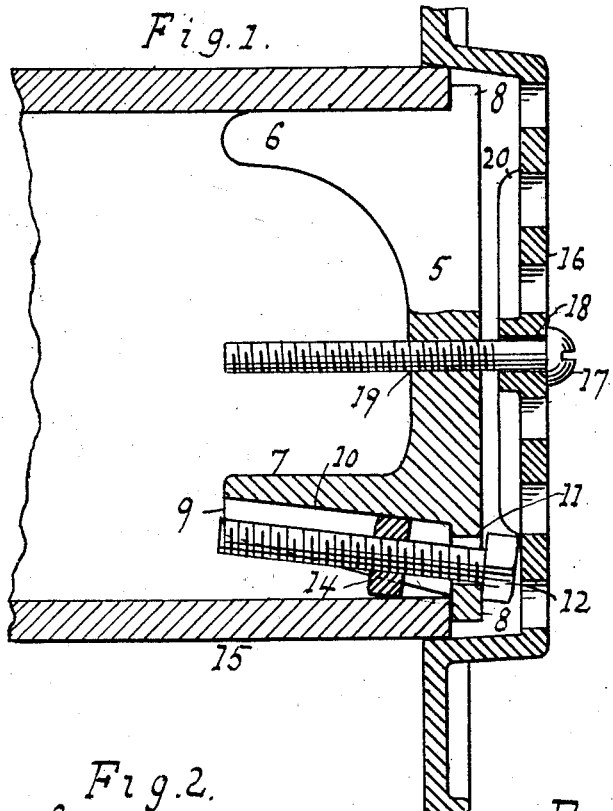
Fig. 1 represents a vertical section of a device embodying the invention.
Figure 2:
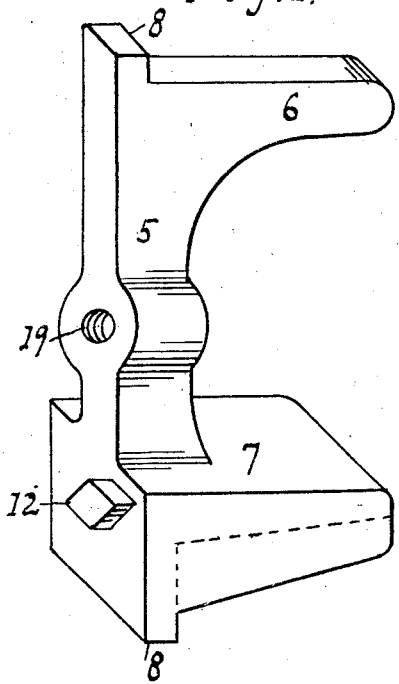
Fig. 2 is a perspective view of a clamp.
Figure 3:
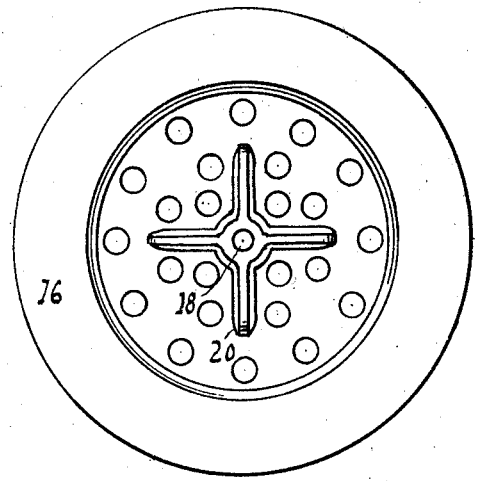
Fig. 3 is an inverted plan view of a perforated cover.

In the drawing is shown a clamp consisting of a shank member 5 having legs 6 and 7 projecting at right angles from the shank. The shank is provided with shoulders 8 one being opposite the other. The leg 7 has a box like recess 9 one of the enclosing walls of which forms an inclined plane 10 and a hole 11 communicates with the recess.

A screw bolt 12 is inserted into the hole and a nut 14 is mounted on the threaded stem of the bolt. The clamp is adapted to be positioned in the end of a conduit 15 for conveying air, liquid or other fluids. As indicated in Fig. 1 the leg 6 and the nut 14 jam against the inner surface of the conduit thus holding the clamp firmly in place. The bolt is arranged loosely in the hole 11 and when it is turned the nut rides up or down the incline to loosen or tighten the clamp. The shoulders forming the ends of the shank strike against the ends of the conduit thereby constituting stops to prevent inward movement of the clamp. The inclined plane in connection with the interior of the conduit forms a wedge like space gradually narrowing towards the hole 11 so that when the nut is forced toward the hole by turning the bolt it travels or is drawn up the inclined plane of the leg and the nearer it gets to the hole the more it becomes wedged.

In order to cover the end of the conduit a perforated cast metal plate 16 is employed. This plate is dish shaped so that it will clear the protruding parts of the clamp and it is fastened to the clamp by means of a screw 17 passing through an aperture 18 and made to engage a threaded bore 19 located in the shank member. The perforated part of the plate is reinforced by a number of ribs 20 cast on the inner side and radiating from the aperture to reinforce the plate. The plate is preferably used to cover a fresh air inlet pipe adapted to suck air into a building. It will be readily understood that the nut could be rectangular so as to give it plenty of bearing surface along the inclined plane.

The walled recess wherein the nut travels prevents lateral displacement of the nut thus keeping the screw bolt from shifting sideways and displacement of the nut from the inclined plane is obviated.

In practice the dish shaped plate rests onto the outer surface of the wall of the building, not shown, and the conduit can terminate any distance beyond the plate or within the limits of its adjustment by the screw. The plate as shown in Fig. 1 has been set at its extreme position toward the clamp and covers the mouth of the conduit which in this instance sligthly projects from the wall but could terminate within the wall and the plate adjusted accordingly. It will be understood, that the plate adjustment is entirely independent of the conduit clamp adjusting means and it constitutes an ornamental cover for an inexpensive cast iron clamp.

I claim:—

1. In a conduit cover clamp the combination with a shank member having a threaded bore arranged to set on the end of a conduit, adjustable devices for clamping the shank to the conduits of variable interior diameter, of a plate covering the mouth of the conduit adapted to contact with the wall of a building, said plate having an aperture positioned opposite the bore in the shank, and a screw connected to the aperture engaging the threaded bore for adjusting the plate to or from the shank independent of the clamping means.

2. In a conduit cover clamp the combination with a shank member having a threaded bore arranged to set on the end of a conduit, said shank including legs projecting into the conduit, adjustable devices coacting with a leg to clamp the shank to the conduits of variable interior diameter, of a dished perforated plate to clear the adjustable devices covering the mouth of the conduit and adapted to contact with the wall of a building, said plate having a central aperture positioned opposite the bore in the shank, and a screw with a stem loosely mounted in the aperture engaging the bore in the shank made to adjust the plate to or from the shank independent of the clamp adjusting means.

In testimony whereof I have hereunto set my hand.

JACOB MANNESCHMIDT, Jr.